(12) United States Patent
Singh et al.

(10) Patent No.: US 12,506,547 B2
(45) Date of Patent: Dec. 23, 2025

(54) ADAPTIVE SWITCHING BETWEEN OPEN RADIO ACCESS NETWORK (O-RAN) ASSISTED ANTENNA CALIBRATION MODES

(71) Applicant: QUALCOMM Incorporated, San Diego, CA (US)

(72) Inventors: Aman Kumar Singh, Hyderabad (IN); Samel Celebi, West New York, NJ (US); Soumen Mitra, Hyderabad (IN); Guruvardhan Routhu, Hyderabad (IN); Loksiva Paruchuri, Hyderabad (IN); Tushar Singh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 18/457,988

(22) Filed: Aug. 29, 2023

(65) Prior Publication Data
US 2025/0080245 A1    Mar. 6, 2025

(51) Int. Cl.
*H04B 17/12* (2015.01)
*H04W 88/08* (2009.01)

(52) U.S. Cl.
CPC ........... *H04B 17/12* (2015.01); *H04W 88/085* (2013.01)

(58) Field of Classification Search
CPC ...... H04B 17/12; H04B 17/21; H04W 88/085
See application file for complete search history.

(56) References Cited

U.S. PATENT DOCUMENTS

| 2010/0136932 | A1* | 6/2010 | Osterling | H04W 24/08 455/226.1 |
| 2016/0254851 | A1* | 9/2016 | Yan | H04B 7/0805 455/552.1 |
| 2021/0400513 | A1* | 12/2021 | Raghavan | H04B 17/21 |

\* cited by examiner

*Primary Examiner* — Ankur Jain
(74) *Attorney, Agent, or Firm* — Seyfarth Shaw LLP (57) ABSTRACT

A method of wireless communication by an open radio access network-radio unit (O-RU) includes transmitting to an open radio access network-distribution unit (O-DU), a first message including antenna calibration capabilities. The O-RU receives, responsive to the first message, a second message from the O-DU. The second message includes a subscription to calibration mode switching. The O-RU dynamically adapts an antenna calibration mode to a self-calibration mode in response to a radio frequency performance metric being less than a predefined threshold value prior to expiration of a calibration timer.

28 Claims, 7 Drawing Sheets

ADAPTIVE SWITCHING BETWEEN OPEN RADIO ACCESS NETWORK (O-RAN) ASSISTED ANTENNA CALIBRATION MODES

FIELD OF THE DISCLOSURE

The present disclosure relates generally to wireless communications, and more specifically to adaptive switching between open radio access network (O-RAN) assisted antenna calibration modes.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects of the present disclosure, a method of wireless communication by an open radio access network-radio unit (O-RU) includes transmitting to an open radio access network-distribution unit (O-DU), a first message including antenna calibration capabilities. The method also includes receiving, responsive to the first message, a second message from the O-DU. The second message includes a subscription to calibration mode switching. The method further includes dynamically adapting an antenna calibration mode to a self-calibration mode in response to a radio frequency performance metric being less than a predefined threshold value prior to expiration of a calibration timer.

Various aspects of the present disclosure are directed to an apparatus including means for transmitting to an open radio access network-distribution unit (O-DU), a first message including antenna calibration capabilities. The apparatus also includes means for receiving, responsive to the first message, a second message from the O-DU, the second message including a subscription to calibration mode switching. The apparatus further includes means for dynamically adapting an antenna calibration mode to a self-calibration mode in response to a radio frequency performance metric being less than a predefined threshold value prior to expiration of a calibration timer.

In some aspects of the present disclosure, a non-transitory computer-readable medium with non-transitory program code recorded thereon is disclosed. The program code is executed by a processor and includes program code to transmit to an open radio access network-distribution unit (O-DU), a first message including antenna calibration capabilities. The program code also includes program code to receive, responsive to the first message, a second message from the O-DU, the second message including a subscription to calibration mode switching. The program code further includes program code to dynamically adapt an antenna calibration mode to a self-calibration mode in response to a radio frequency performance metric being less than a predefined threshold value prior to expiration of a calibration timer.

Various aspects of the present disclosure are directed to an apparatus having a memory and one or more processors coupled to the memory. The processor(s) is configured to transmit to an open radio access network-distribution unit (O-DU), a first message including antenna calibration capabilities. The processor(s) is also configured to receive, responsive to the first message, a second message from the O-DU, the second message including a subscription to calibration mode switching. The processor(s) is further configured to dynamically adapt an antenna calibration mode to a self-calibration mode in response to a radio frequency performance metric being less than a predefined threshold value prior to expiration of a calibration timer.

In some aspects of the present disclosure, a method for wireless communication by an open radio access network-distribution unit (O-DU) includes receiving, from an open radio access network-receiving unit (O-RU), a first message including antenna calibration capabilities. The method still further includes transmitting, responsive to the first message, a second message to the O-RU. The second message includes a subscription to calibration mode switching to enable dynamic adaption of the antenna calibration mode to a self-calibration mode by the O-RU prior to expiration of a calibration timer.

Various aspects of the present disclosure are directed to an apparatus including means for receiving, from an open radio access network-receiving unit (O-RU), a first message including antenna calibration capabilities. The apparatus also includes means for transmitting, responsive to the first message, a second message to the O-RU. The second message includes a subscription to calibration mode switching to enable dynamic adaption of the antenna calibration mode to a self-calibration mode by the O-RU prior to expiration of a calibration timer.

In some aspects of the present disclosure, a non-transitory computer-readable medium with non-transitory program code recorded thereon is disclosed. The program code is executed by a processor and includes program code to receive, from an open radio access network-receiving unit (O-RU), a first message including antenna calibration capabilities. The program code further includes program code to transmit, responsive to the first message, a second message to the O-RU. The second message includes a subscription to calibration mode switching to enable dynamic adaption of the antenna calibration mode to a self-calibration mode by the O-RU prior to expiration of a calibration timer.

Various aspects of the present disclosure are directed to an apparatus having a memory and one or more processors coupled to the memory. The processor(s) is configured to receive, from an open radio access network-receiving unit (O-RU), a first message including antenna calibration capabilities. The processor(s) is also configured to transmit, responsive to the first message, a second message to the O-RU. The second message includes a subscription to calibration mode switching to enable dynamic adaption of the antenna calibration mode to a self-calibration mode by the O-RU prior to expiration of a calibration timer.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

During power on and operation (may be referred to as mission mode) various open radio access network (O-RAN) radio unit (O-RU) key performance indicators (KPIs), such as antenna phase alignment, direct current (DC) offset, phase (I) and quadrature (Q) (IQ) imbalance, power accuracy, impedance mismatch etc., for example, may drift over time or due to operating conditions including temperature and humidity, for example. As a result, the overall communication system performance may be degraded.

In response to the degraded system performance, conventional approaches may involve the O-RU allocating some of its time and frequency resources for measurement, detection, and compensation of such parameters. This may be referred to as online calibration. The time and/or frequency resources designated for online calibration may be negotiated between an O-RAN distribution unit (O-DU) and the O-RU to reduce service disruptions.

An O-RAN has four distinct negotiation modes in which either the O-DU or the O-RU may act as a primary decision maker for the planned resources. One of the negotiation modes is the coordinated mode. In the coordinated mode, the O-RU may decide on the time and/or frequency resources to be used for online calibration. In its implementation of the coordinated mode, the O-RU notifies the O-DU in advance of an intended calibration time. The default for such advance notice is 60 seconds. However, during a 60-second delay or even a shorter delay, the KPIs can further degrade, for example, due to a temperature rise, and may result in data loss or service disruption.

The O-RU performs a periodic timer-triggered coordinated calibration. As such, if the temperature or other environmental condition at the O-RU changes suddenly, then the O-RU waits until the prescribed time period (e.g., 60 seconds) after informing the O-DU of a coordinated antenna calibration request. In each such instance, the delayed antenna calibration may result in reduced radio frequency (RF) performance and data loss. Furthermore, because the antenna calibration process may occur multiple times, over a length of time due to various conditions, the cumulative effect of data loss and RF performance degradation may potentially become significant.

Accordingly, to address these and other issues, aspects of the present disclosure are directed to adaptive switching of the antenna calibration mode. The antenna calibration mode may be switched from the coordinated mode to a self-calibration mode. Accordingly, the O-RU may initiate a switch to self-calibration mode without waiting for the expiration of the notification period (e.g., 60 seconds).

Particular aspects of the subject matter described in this disclosure can be implemented to realize one or more of the following potential advantages. In some examples, the described techniques may reduce data loss and service disruption, and may improve RF performance.

Figure 1:
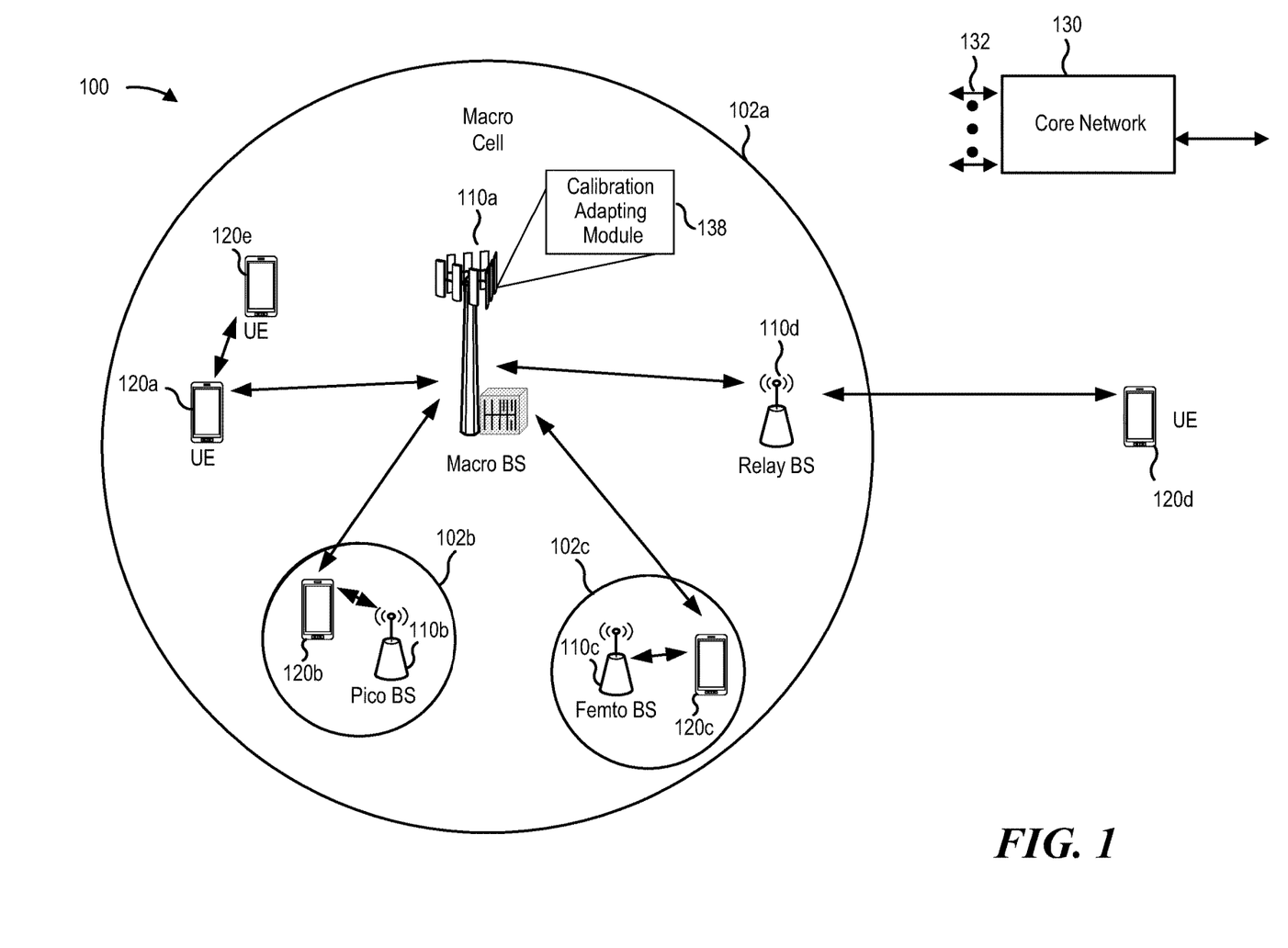
FIG. 1 is a block diagram conceptually illustrating an example of a wireless communications network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120c) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

Figure 3:
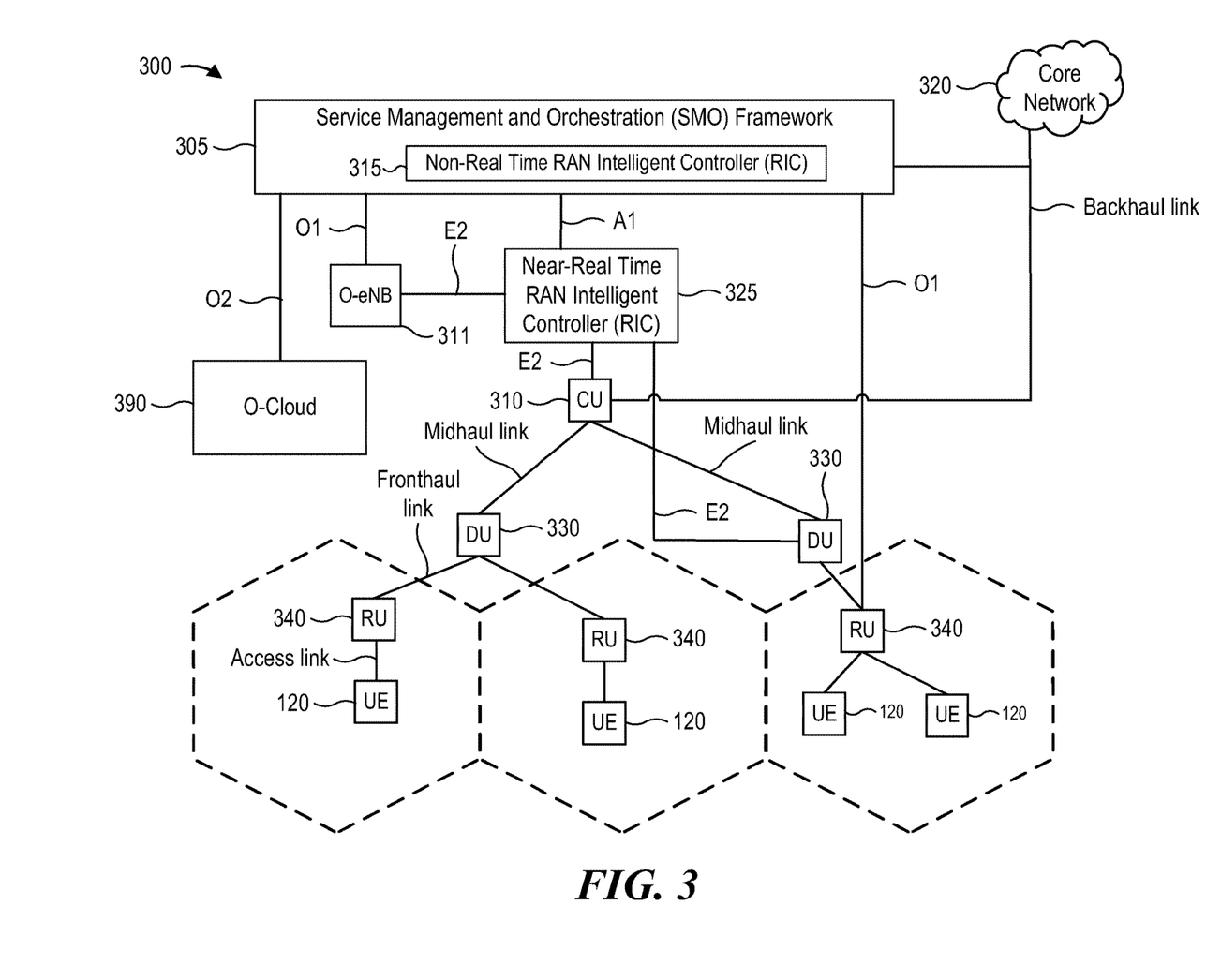
FIG. 3 is a block diagram illustrating an example disaggregated base station architecture, in accordance with various aspects of the present disclosure.

The base stations 110 or any other network device (e.g., as seen in FIG. 3) may include a calibration adapting module 138 for adaptively switching an antenna calibration mode. The calibration adapting module 138 may transmit to an open radio access network-distribution unit (O-DU), a first message including antenna calibration capabilities. The calibration adapting module 138 may also receive, responsive to the first message, a second message from the O-DU. The second message may include a subscription to calibration mode switching. Furthermore, the calibration adapting module 138 may dynamically adapt an antenna calibration mode to a self-calibration mode in response to a radio frequency performance metric being less than a predefined threshold value prior to expiration of a calibration timer.

As indicated above, FIG. 1 is provided merely as an example. Other examples may differ from what is described with regard to FIG. 1.

Figure 2:
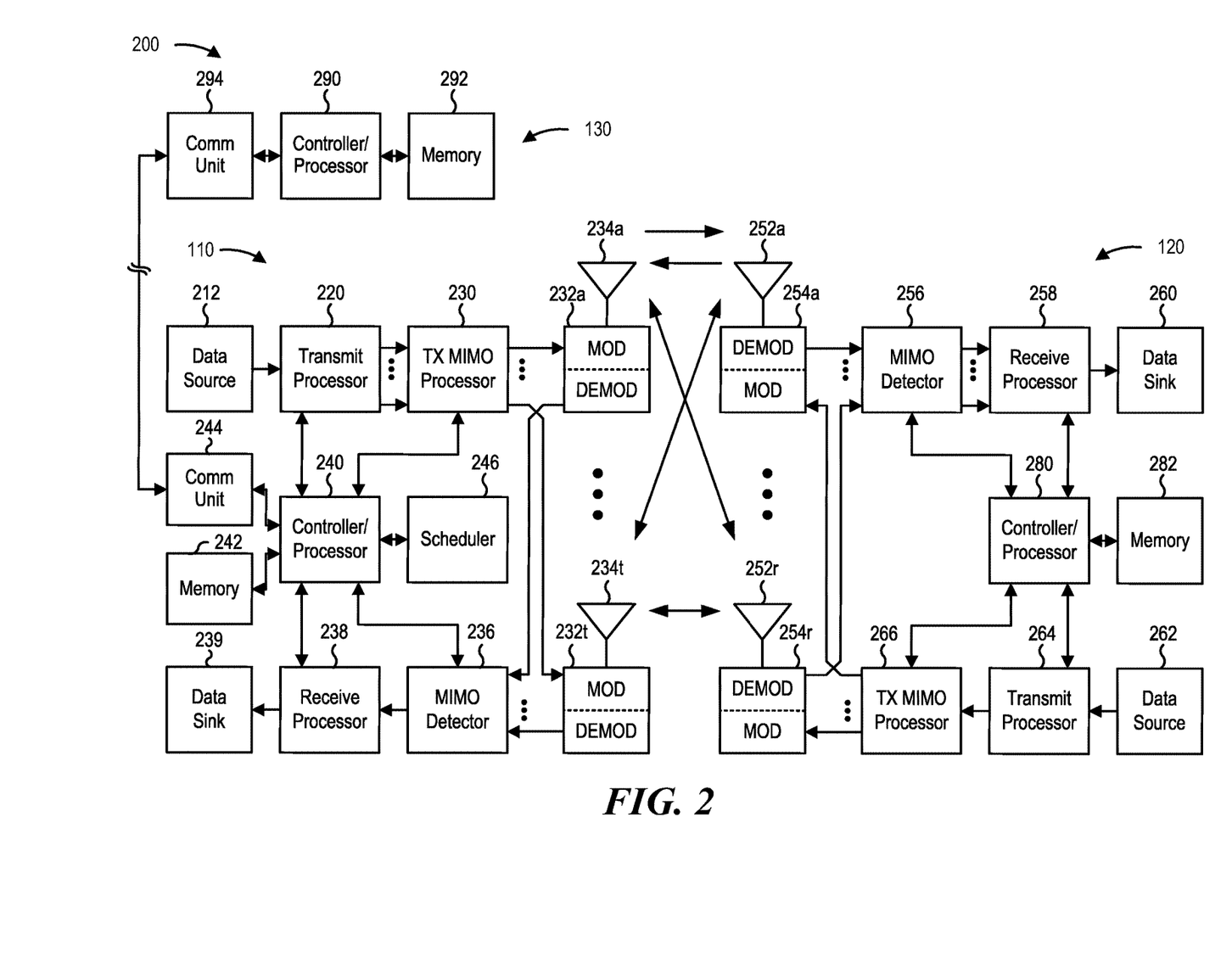
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ. CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (CNB), an NR BS. 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. For instance, disaggregation may be realized by using distributing functionality across one or more of the DU 330 (which may comprise O-RAN DUS (O-DUs)) and one or more of the RU 340 (which may comprise O-RAN RUs (O-RUs)). The various units of the disaggregated base station, or disaggregated RAN architecture, can be configured for wired or wireless communication with at least one other unit.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation, and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

In some aspects, the disaggregated base station 300 architecture may include means for transmitting, means for receiving, and means for dynamically adapting. Such means may include one or more components of the disaggregated base station 300 described in connection with FIG. 3.

As described, aspects of the present disclosure are directed to adaptive switching of the antenna calibration mode. In accordance with various aspects of the present disclosure, the antenna calibration mode may be switched from the coordinated mode to a self-calibration mode. That is, an O-RU may initiate a switch to self-calibration mode without waiting for the expiration of a calibration notification period (e.g., 60 seconds).

An antenna calibration mode may be established at system boot-up. At boot-up, an O-RU (e.g., the RU 340 of FIG. 3 configured for an open radio access network) may exchange messages with an O-DU (e.g., (e.g., the DU 330 of FIG. 3 configured for an open radio access network) via a fronthaul link to communicate antenna calibration capabilities. The antenna calibration capabilities may include available modes for conducting an antenna calibration, antenna calibration parameters, and resources that may be used for the antenna calibration.

The O-DU may in turn communicate the antenna calibration capabilities to a layer two (L2) interface of the O-DU. The L2 interface may comprise a functional application platform interface (FAPI), for example. The L2 interface of the O-DU may set, via the O-DU, a switch calibration mode flag in the O-RU. The O-DU may send a message to the O-RU to subscribe (e.g., using a create-subscription function) for calibration mode switch notification.

Accordingly, the O-RU may send a calibration mode switch remote procedure call (RPC) notification to the O-DU to switch the calibration mode. For instance, the O-RU may detect a change in environmental conditions (e.g., a change in temperature or humidity) or determine that certain RF performance metrics (e.g., RF key performance indicators (KPIs)) are below a predefined threshold, for instance. In response to such conditions, the O-RU may send an RPC request for a calibration mode switch to the O-DU. The O-RU may notify the L2 interface, via the O-DU, of the resources (e.g., frequency and/or time) that may be used for an antenna calibration. Then, the O-RU may begin the self-calibration operation without waiting the calibration notification period (e.g., 60 seconds).

Figure 4:
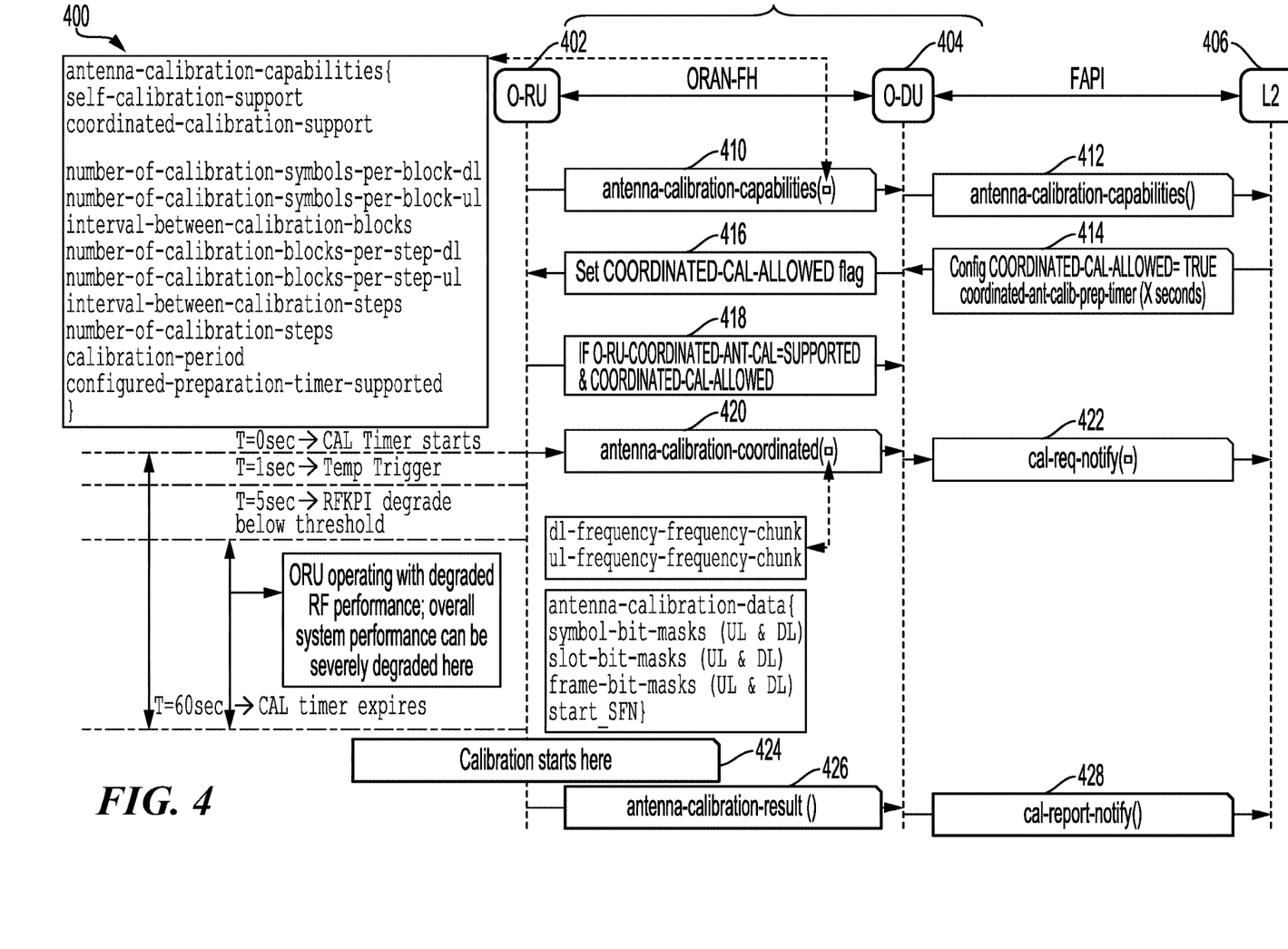
FIG. 4 is an example call flow diagram illustrating a conventional antenna calibration approach.

FIG. 4 is an example call flow diagram 400 illustrating a conventional antenna calibration approach. An O-RU 402 may exchange messages via an O-RAN-fronthaul link with an O-DU 404 and an L2 interface 406 of the O-DU 404. The L2 interface 406 may comprise a FAPI, for instance. At block 410, the O-RU 402 transmits a message to the O-DU 404. The message includes an indication of antenna calibration capabilities. The antenna calibration capabilities may include a coordinated calibration mode and a self-calibration mode. The antenna capabilities may also indicate parameters associated with the antenna calibration. For instance, the parameters may include a number of calibration symbols per block for download and/or upload, an interval between calibration blocks, a number of calibration block per step for download and/or upload, an interval between calibration steps, a number of calibration steps, a calibration period, and/or a configured preparation timer.

At block 412, the O-DU 404 transmits a message to the L2 interface 406 to inform the L2 interface 406 of the antenna calibration capabilities advertised in the messages from the O-RU 402.

At block 414, the L2 interface 406, in response to the advertised antenna calibration capabilities, transmits a message to the O-DU 404 indicating the configuration for coordinated mode calibration. The message may also define a time period (e.g., x seconds, where x is an integer) to delay the calibration so as to allow for preparation tasks to complete. The time period may be set at 60 seconds by default.

At block 416, the O-DU 404 sets a coordinated mode calibration allowed flag at the O-RU 402. That is, the O-DU 404 may inform the O-RU 402 of the calibration mode that is allowed. However, only one calibration mode may be allowed (e.g., set as TRUE) at a time.

At block 418, the O-RU 402 informs the O-DU 404 that an antenna calibration procedure is to be performed using the coordinated mode calibration. The O-RU 402 may also inform the O-DU 404 of the resources (e.g., frequency resources or time resources) that may be used to conduct the antenna calibration.

At block 420, the O-RU 402 starts a calibration timer. The time period for the timer may be set according to the time period defined by the O-DU 404 to accommodate performing of preparation tasks (e.g., 60 seconds). The message of block 418 is transmitted to the O-DU 404 a time period corresponding to the preparation period before the antenna calibration may be started. At block 422, the O-DU 404 transmits a calibration request notification message to the L2 interface 406.

Thereafter, the O-RU 402 waits until the expiration of the calibration preparation timer before performing the antenna calibration. As shown in the example of FIG. 4, using the coordinated mode calibration, the O-RU 402 waits the defined calibration preparation time period even if the O-RU 402 detects a temperature condition or a radio frequency (RF) performance metric degrades below a threshold. The O-RU 402 may independently decide to switch to any calibration mode.

Then, after the expiration of the calibration preparation time period, at block 424, the O-RU 402 may start performing the antenna calibration procedure. At block 426 the O-RU 402 transmits a calibration result message to the O-DU 404. At block 428, the O-DU 404 notifies the L2 interface 406 of the calibration results.

Figure 5:
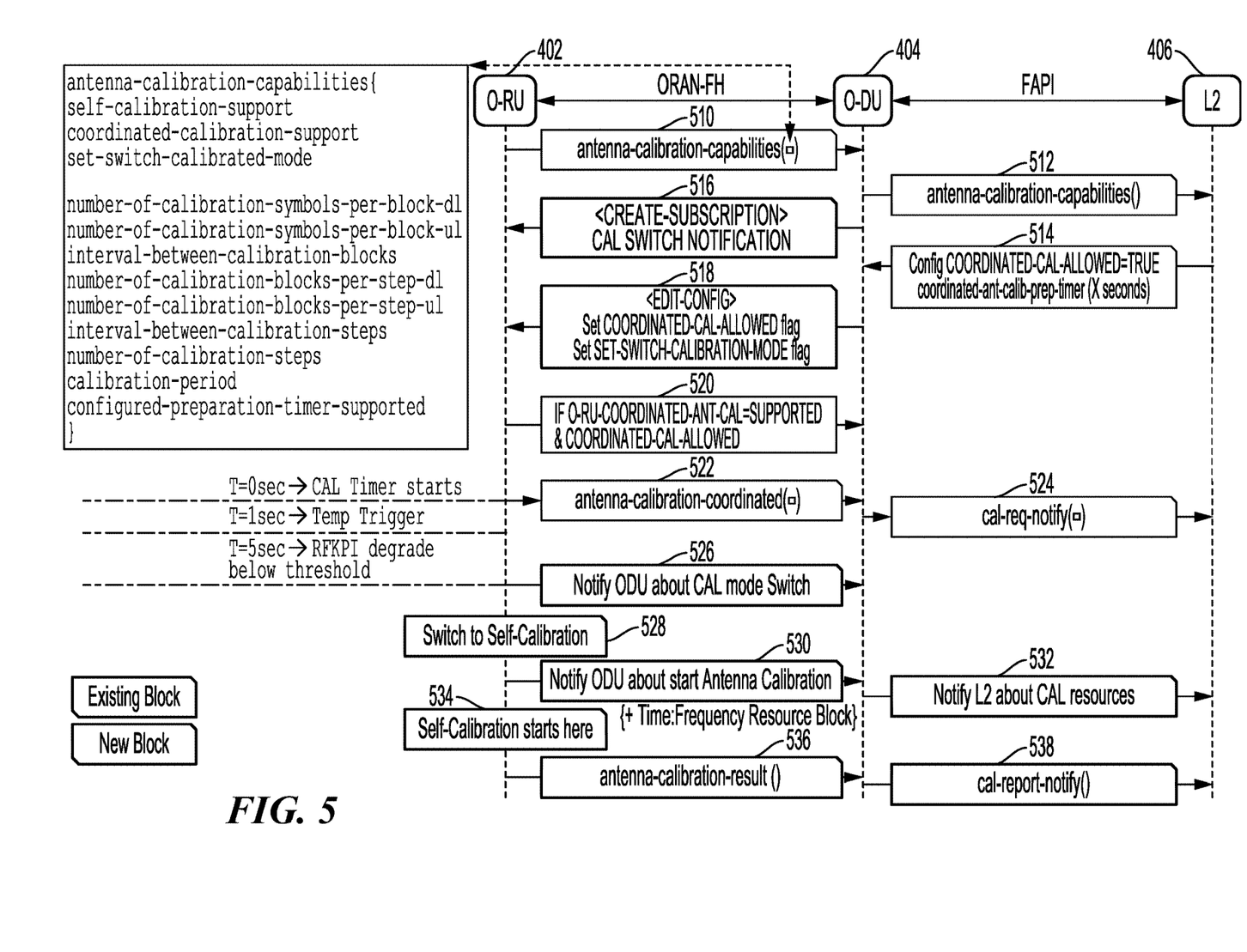
FIG. 5 is an example call flow diagram illustrating adaptive switching of the antenna calibration mode, in accordance with various aspects of the present disclosure.

FIG. 5 is an example call flow diagram 500 illustrating adaptive switching of the antenna calibration mode, in accordance with various aspects of the present disclosure. Referring to FIG. 5, the O-RU 402 may exchange messages via an O-RAN-fronthaul link with the O-DU 404 and the L2 interface 406 of the O-DU 404. At block 510, the O-RU 402 transmits an antenna calibration capabilities message to the O-DU 404. The antenna calibration capabilities message includes an indication of antenna calibration capabilities. The antenna calibration capabilities may include a coordinated calibration mode, a self-calibration mode, or other supported modes, for example. However, unlike the conventional approach, the antenna calibration capabilities may further include a flag for setting a switch calibration mode. The switch calibration mode flag may be set to enable the O-RU 402 to unilaterally switch the calibration mode, for example, between the coordinated calibration mode and the self-calibration mode.

At block 512, the O-DU 404 transmits a capabilities notification message to the L2 interface 406 to inform the L2 interface 406 of the antenna calibration capabilities advertised in the antenna calibration capabilities message from the O-RU 402.

At block 514, the L2 interface 406, in response to the advertised antenna calibration capabilities, transmits a configuration message to the O-DU 404 indicating the configuration for coordinated mode calibration. The configuration message may also define a time period (e.g., x seconds, where x is an integer) to delay the calibration so as to allow for preparation tasks to complete. The calibration preparation time period may be set at 60 seconds by default.

At block 516, the O-DU 404 transmits a calibration switching notification message to the O-RU 402. The calibration switching notification message may include a subscription for the switch calibration mode. By subscribing to the switch calibration mode, the O-DU 404 informs the O-RU 402 that unilateral switching of the antenna calibration mode is enabled.

At block 518, the O-DU 404 may also set a configuration flag to enable the O-RU 402 to utilize the coordinated mode calibration. Additionally, the O-DU 404 may set the switch calibration mode flag to enable the O-RU 402 to switch the calibration mode. That is, the O-RU 402 is enabled to use the coordinated calibration mode as well as the self-calibration mode for antenna calibration.

At block 520, the O-RU 402 informs the O-DU 404 that an antenna calibration procedure using the coordinated mode calibration is to be performed. At block 522, the O-RU 402 starts a calibration timer. The time period for the calibration timer may be set according to the time period defined by the O-DU 404 to accommodate preparation tasks (e.g., 60 seconds). At block 524, the O-DU 404 transmits a calibration request notification message to the L2 interface 406.

In the example of FIG. 5, if one second after the calibration timer has started, a temperature condition is detected resulting in an RF performance metric falling below a threshold prior to the expiration of the calibration timer (e.g., at T=5 seconds), the O-RU 402 may unilaterally change the calibration mode from the coordinated calibration mode to the self-calibration mode. That is, rather than waiting for the expiration of the calibration timer (e.g., 60 seconds), at block 526, the O-RU 402 may notify the O-DU 404 of the calibration mode switch.

Then, at block 528, O-RU 402 switches to the self-calibration mode. At block 530 the O-RU 402 notifies the O-DU 404 of initiating antenna calibration. In doing so, the O-RU 402 may specify the antenna calibration resources (e.g., the frequency and/or time resources) to be used for conducting the antenna calibration.

At block 532, the O-DU 404 may in turn notify the L2 interface 406 of the antenna calibration resources (frequency resources and/or time resources).

At block 534, the O-RU 402 may start the self-calibration procedure. Then, after the self-calibration procedure is complete, at block 536, the O-RU 402 may transmit a calibration result message to the O-DU 404. At block 538, the O-DU 404 may notify the L2 interface 406 of the calibration results.

As indicated above, FIGS. 3-5 are provided as examples. Other examples may differ from what is described with respect to FIGS. 3-5.

Figure 6:
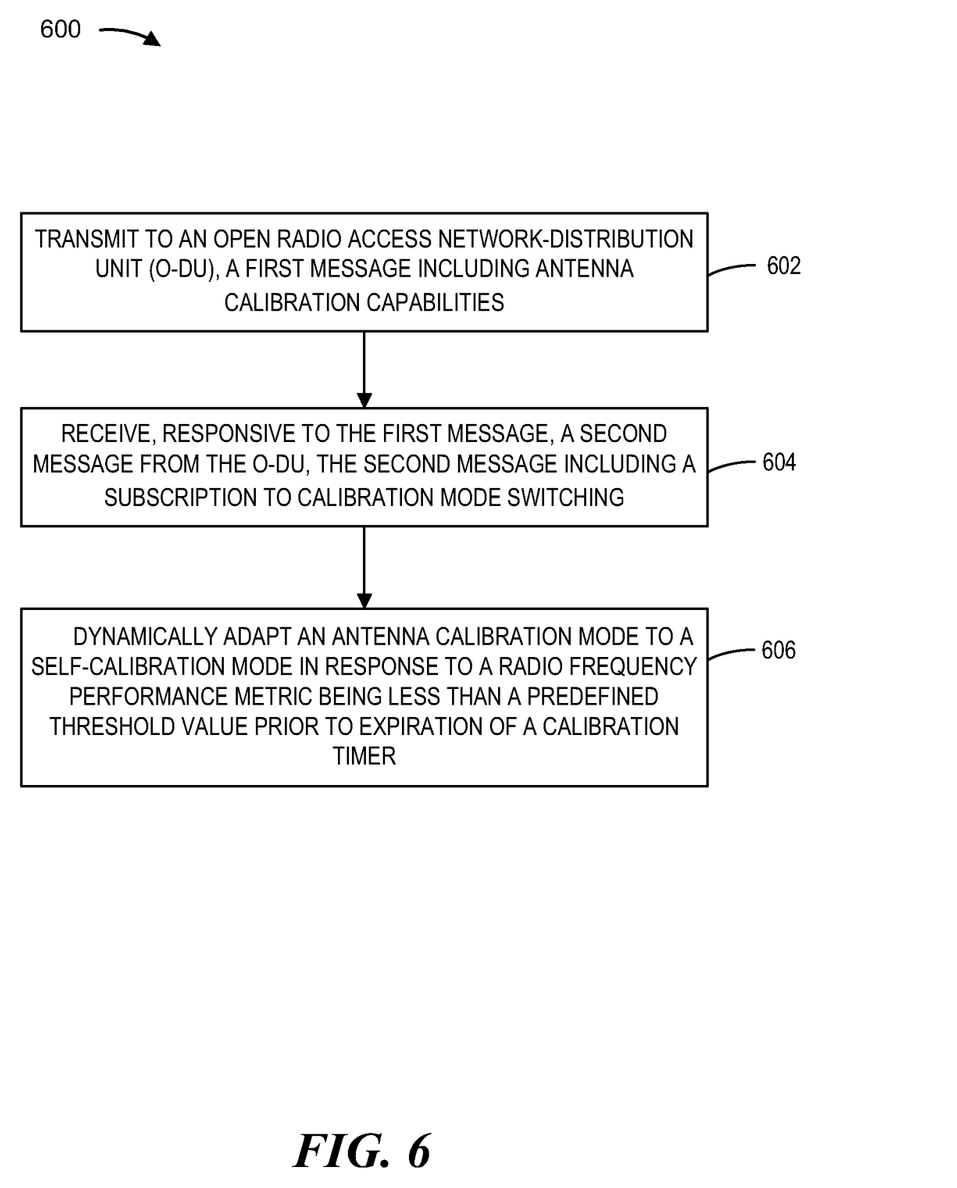
FIG. 6 is a flow diagram illustrating an example process performed, for example, by an open radio access network (O-RAN)-radio unit (O-RU), in accordance with various aspects of the present disclosure.

FIG. 6 is a flow diagram illustrating an example process 600 performed, for example, by an O-RU, in accordance with various aspects of the present disclosure. The operations of the example process 600 may be implemented by one or more RUS 340 configured for open radio access network connectivity.

At block 602, the O-RU transmits to an open radio access network-distribution unit (O-DU), a first message including antenna calibration capabilities. For example, the O-RU may use the controller/processor 240 and/or the memory 242 to transmit the first message. For instance, as described with reference to FIG. 5, the O-RU 402 may transmit an antenna calibration capabilities message to the O-DU 404. The antenna calibration capabilities message includes an indication of antenna calibration capabilities. The antenna calibration capabilities may include a coordinated calibration mode, a self-calibration mode, or other supported modes, for example. Furthermore, the antenna calibration capabilities may include a flag for setting a switch calibration mode. The switch calibration mode flag may be set to enable the O-RU 402 to unilaterally switch the calibration mode, for example, between the coordinated calibration mode and the self-calibration mode.

At block 604, the O-RU receives, responsive to the first message, a second message from the O-DU. The second message includes a subscription to calibration mode switching. For example, the O-RU may use the controller/processor 240 and/or the memory 242 to receive the second message from the O-DU. As described, for instance, with reference to FIG. 5, the O-DU 404 may transmit a calibration switching notification message to the O-RU 402. The calibration switching notification message may include a subscription for the switch calibration mode. By subscribing to the switch calibration mode, the O-DU 404 may inform the O-RU 402 that unilateral switching of the antenna calibration mode is enabled.

At block 606, the O-RU dynamically adapts an antenna calibration mode to a self-calibration mode in response to a radio frequency performance metric being less than a predefined threshold value prior to expiration of a calibration timer. For example, the O-RU may use the controller/processor 240 and/or the memory 242 to dynamically adapt the antenna calibration mode to the self-calibration mode. For instance, as described with reference to FIG. 5, the O-RU 402 may unilaterally change the calibration mode from the coordinated calibration mode to the self-calibration mode rather than waiting for the expiration of the calibration timer (e.g., 60 seconds).

Figure 7:
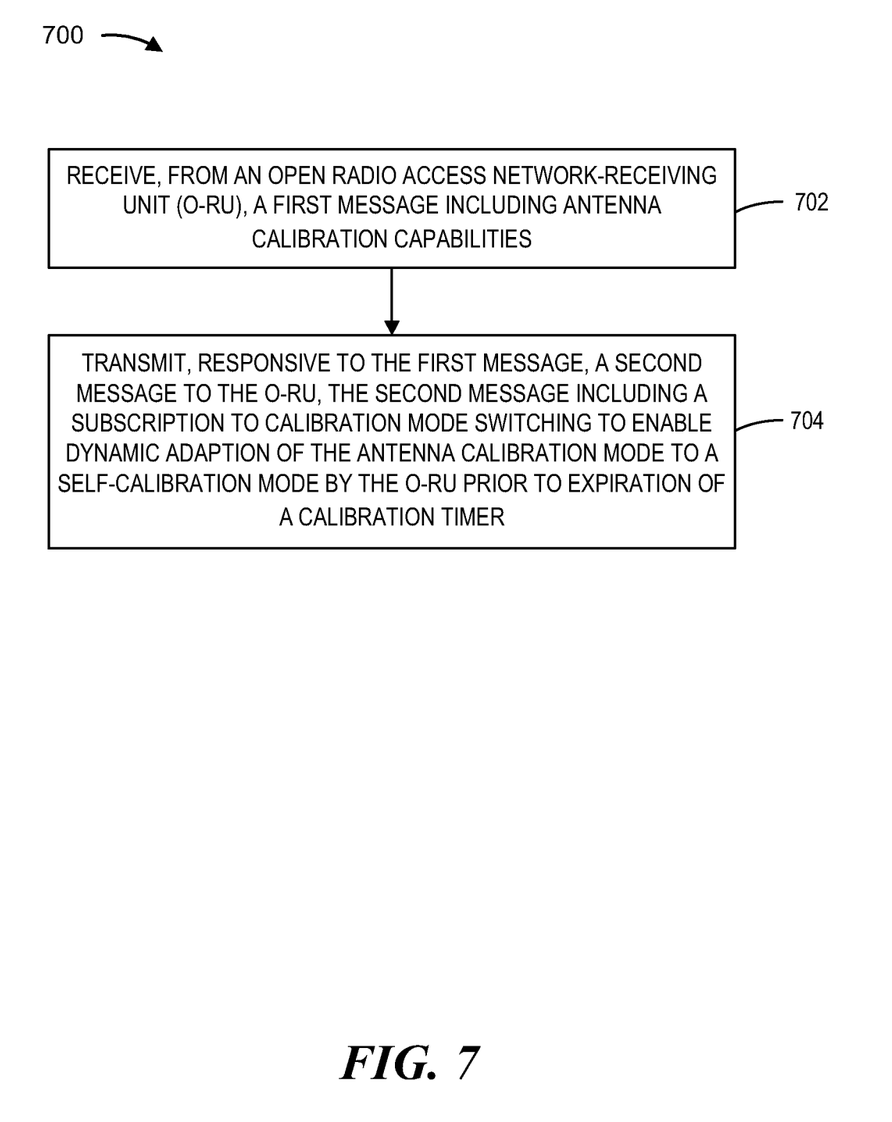
FIG. 7 is a flow diagram illustrating an example process performed, for example, by an O-RAN distribution unit (O-DU), in accordance with various aspects of the present disclosure.

FIG. 7 is a flow diagram illustrating an example process 700 performed, for example, by an O-DU, in accordance with various aspects of the present disclosure. The operations of the example process 700 may be implemented by one or more DUs 330 configured for open radio access network connectivity.

At block 702, the O-DU receives, from an open radio access network-receiving unit (O-RU), a first message including antenna calibration capabilities. For instance, as shown in FIG. 5, the O-DU 404 receives an antenna calibration capabilities message from the O-RU 402. The antenna calibration capabilities message includes an indication of antenna calibration capabilities. The antenna calibration capabilities may include a coordinated calibration mode, a self-calibration mode, or other supported modes, for example. The antenna calibration capabilities may further include a flag for setting a switch calibration mode.

At block 704, the O-DU transmits, responsive to the first message, a second message to the O-RU. The second message includes a subscription to calibration mode switching to enable dynamic adaption of the antenna calibration mode to a self-calibration mode by the O-RU prior to expiration of a calibration timer. For instance, as described with reference to FIG. 5, the O-DU 404 transmits a calibration switching notification message to the O-RU 402. The calibration switching notification message may include a subscription for the switch calibration mode. By subscribing to the switch calibration mode, the O-DU 404 informs the O-RU 402 that unilateral switching of the antenna calibration mode is enabled. Accordingly, the O-RU 402 may be enabled to unilaterally change the calibration mode from the coordinated calibration mode to the self-calibration mode.

As such, the O-RU may initiate an antenna calibration prior to the expiration of the calibration timer (e.g., 60 seconds).

Implementation examples are provided in the following numbered clauses.

1. A method of wireless communication by an open radio access network-radio unit (O-RU), comprising:
   transmitting to an open radio access network-distribution unit (O-DU), a first message including antenna calibration capabilities;
   receiving, responsive to the first message, a second message from the O-DU, the second message including a subscription to calibration mode switching; and
   dynamically adapting an antenna calibration mode to a self-calibration mode in response to a radio frequency performance metric being less than a predefined threshold value prior to expiration of a calibration timer.
2. The method of clause 1, further comprising transmitting, to the O-DU, a third message including an antenna calibration mode switch notification indicating the self-calibration mode.
3. The method of clause 1 or 2, further comprising transmitting, to the O-DU, a fourth message indicating a start of antenna calibration.
4. The method of any of clauses 1-3, further comprising notifying a layer two (L2) of the O-DU of resources for antenna calibration.
5. The method of any of clauses 1-4, in which the L2 of the O-DU is notified via an interface and the resources for the antenna calibration include frequency and/or time resources that the O-RU intends to use for the antenna calibration.
6. The method of any of clauses 1-5, in which the radio frequency performance metric relates to a detected temperature or detected humidity.
7. The method of any of clauses 1-6, further comprising calibrating an antenna according to the self-calibration mode.
8. The method of any of clauses 1-7, in which the second message further indicates a capability for coordinated-mode calibration.
9. A method of wireless communication by an open radio access network-distribution unit (O-DU), comprising:
   receiving, from an open radio access network-receiving unit (O-RU), a first message including antenna calibration capabilities; and
   transmitting, responsive to the first message, a second message to the O-RU, the second message including a subscription to calibration mode switching to enable dynamic adaption of an antenna calibration mode to a self-calibration mode by the O-RU prior to expiration of a calibration timer.
10. The method of clause 9, further comprising receiving, from the O-RU, a third message including an antenna calibration mode switch notification indicating the self-calibration mode.
11. The method of clause 9 or 10, further comprising receiving, from the O-RU, a fourth message indicating a start of antenna calibration.
12. The method of any of clauses 9-11, further comprising notifying a layer two (L2) of the O-DU of resources for antenna calibration.
13. The method of any of clauses 9-12, in which the L2 of the O-DU is notified via an interface and the resources for the antenna calibration include frequency and/or time resources that the O-RU intends to use for the antenna calibration.
14. The method of any of clauses 9-13, in which the dynamic adaption is triggered in response to a radio frequency performance metric being less than a predefined threshold value prior to the expiration of the calibration timer.
15. An apparatus for wireless communication by an open radio access network-radio unit (O-RU), comprising:
    a memory; and
    at least one processor coupled to the memory, the at least one processor configured:
       to transmit to an open radio access network-distribution unit (O-DU), a first message including antenna calibration capabilities;
       to receive, responsive to the first message, a second message from the O-DU, the second message including a subscription to calibration mode switching; and
       to dynamically adapt an antenna calibration mode to a self-calibration mode in response to a radio frequency performance metric being less than a predefined threshold value prior to expiration of a calibration timer.
16. The apparatus of clause 15, in which the at least one processor is further configured to transmit, to the O-DU, a third message including an antenna calibration mode switch notification indicating the self-calibration mode.
17. The apparatus of clause 15 or 16, in which the at least one processor is further configured transmit, to the O-DU, a fourth message indicating a start of antenna calibration.
18. The apparatus of any of clauses 15-17, in which the at least one processor is further configured to notify a layer two (L2) of the O-DU of resources for antenna calibration.
19. The apparatus of any of clauses 15-18, in which the L2 of the O-DU is notified via an interface and the resources for the antenna calibration include frequency and/or time resources that the O-RU intends to use for the antenna calibration.
20. The apparatus of any of clauses 15-19, in which the radio frequency performance metric relates to a detected temperature or detected humidity.
21. The apparatus of any of clauses 15-20, in which the at least one processor is further configured to calibrate an antenna according to the self-calibration mode.
22. The apparatus of any of clauses 15-21, in which the second message further indicates a capability for coordinated-mode calibration.
23. An apparatus for wireless communication by an open radio access network-distribution unit (O-DU), comprising:
    a memory; and
    at least one processor coupled to the memory, the at least one processor configured:
       to receive, from an open radio access network-receiving unit (O-RU), a first message including antenna calibration capabilities; and
       to transmit, responsive to the first message, a second message to the O-RU, the second message including a subscription to calibration mode switching to enable dynamic adaption of an antenna calibration mode to a self-calibration mode by the O-RU prior to expiration of a calibration timer.
24. The apparatus of clause 23, in which the at least one processor is further configured to receive, from the O-RU, a third message including an antenna calibration mode switch notification indicating the self-calibration mode.

25. The apparatus of clause 23 or 24, in which the at least one processor is further configured to receive, from the O-RU, a fourth message indicating a start of antenna calibration.

26. The apparatus of any of clauses 23-25, in which the at least one processor is further configured to notify a layer two (L2) of the O-DU of resources for antenna calibration.

27. The apparatus of any of clauses 23-26, in which the L2 of the O-DU is notified via an interface and the resources for the antenna calibration include frequency and/or time resources that the O-RU intends to use for the antenna calibration.

28. The apparatus of any of clauses 23-27, in which the dynamic adaption is triggered in response to a radio frequency performance metric being less than a predefined threshold value prior to the expiration of the calibration timer.

29. A non-transitory computer-readable medium having program code recorded thereon, the program code executed by a processor and comprising:
program code to transmit to an open radio access network-distribution unit (O-DU), a first message including antenna calibration capabilities;
program code to receive, responsive to the first message, a second message from the O-DU, the second message including a subscription to calibration mode switching; and
program code to dynamically adapt an antenna calibration mode to a self-calibration mode in response to a radio frequency performance metric being less than a predefined threshold value prior to expiration of a calibration timer.

30. A non-transitory computer-readable medium having program code recorded thereon, the program code executed by a processor and comprising:
program code to receive, from an open radio access network-receiving unit (O-RU), a first message including antenna calibration capabilities; and
program code to transmit, responsive to the first message, a second message to the O-RU, the second message including a subscription to calibration mode switching to enable dynamic adaption of an antenna calibration mode to a self-calibration mode by the O-RU prior to expiration of a calibration timer.

31. An apparatus for wireless communication by an open radio access network-radio unit (O-RU), comprising:
means for transmitting to an open radio access network-distribution unit (O-DU), a first message including antenna calibration capabilities;
means for receiving, responsive to the first message, a second message from the O-DU, the second message including a subscription to calibration mode switching; and
means for dynamically adapting an antenna calibration mode to a self-calibration mode in response to a radio frequency performance metric being less than a predefined threshold value prior to expiration of a calibration timer.

32. An apparatus for wireless communication by an open radio access network-distribution unit (O-DU), comprising:
means for receiving, from an open radio access network-receiving unit (O-RU), a first message including antenna calibration capabilities; and
means for transmitting, responsive to the first message, a second message to the O-RU, the second message including a subscription to calibration mode switching to enable dynamic adaption of an antenna calibration mode to a self-calibration mode by the O-RU prior to expiration of a calibration timer.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code-it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by an open radio access network-radio unit (O-RU), comprising:
   transmitting to an open radio access network-distribution unit (O-DU), a first message including antenna calibration capabilities;
   receiving, responsive to the first message, a second message from the O-DU, the second message including a subscription to calibration mode switching; and
   dynamically adapting an antenna calibration mode to a self-calibration mode in response to a radio frequency performance metric being less than a predefined threshold value prior to expiration of a calibration timer.

2. The method of claim 1, further comprising transmitting, to the O-DU, a third message including an antenna calibration mode switch notification indicating the self-calibration mode.

3. The method of claim 2, further comprising transmitting, to the O-DU, a fourth message indicating a start of antenna calibration.

4. The method of claim 2, further comprising notifying a layer two (L2) of the O-DU of resources for antenna calibration.

5. The method of claim 4, in which the L2 of the O-DU is notified via an interface and the resources for the antenna calibration include frequency and/or time resources that the O-RU intends to use for the antenna calibration.

6. The method of claim 1, in which the radio frequency performance metric relates to a detected temperature or detected humidity.

7. The method of claim 1, further comprising calibrating an antenna according to the self-calibration mode.

8. The method of claim 1, in which the second message further indicates a capability for coordinated-mode calibration.

9. A method of wireless communication by an open radio access network-distribution unit (O-DU), comprising:
   receiving, from an open radio access network-receiving unit (O-RU), a first message including antenna calibration capabilities; and
   transmitting, responsive to the first message, a second message to the O-RU, the second message including a subscription to calibration mode switching to enable dynamic adaption of an antenna calibration mode to a self-calibration mode by the O-RU prior to expiration of a calibration timer.

10. The method of claim 9, further comprising receiving, from the O-RU, a third message including an antenna calibration mode switch notification indicating the self-calibration mode.

11. The method of claim 10, further comprising receiving, from the O-RU, a fourth message indicating a start of antenna calibration.

12. The method of claim 10, further comprising notifying a layer two (L2) of the O-DU of resources for antenna calibration.

13. The method of claim 12, in which the L2 of the O-DU is notified via an interface and the resources for the antenna calibration include frequency and/or time resources that the O-RU intends to use for the antenna calibration.

14. The method of claim 10, in which the dynamic adaption is triggered in response to a radio frequency performance metric being less than a predefined threshold value prior to the expiration of the calibration timer.

15. An apparatus for wireless communication by an open radio access network-radio unit (O-RU), comprising:
   a memory; and
   at least one processor coupled to the memory, the at least one processor configured:
      to transmit to an open radio access network-distribution unit (O-DU), a first message including antenna calibration capabilities;
      to receive, responsive to the first message, a second message from the O-DU, the second message including a subscription to calibration mode switching; and
      to dynamically adapt an antenna calibration mode to a self-calibration mode in response to a radio frequency performance metric being less than a predefined threshold value prior to expiration of a calibration timer.

16. The apparatus of claim 15, in which the at least one processor is further configured to transmit, to the O-DU, a third message including an antenna calibration mode switch notification indicating the self-calibration mode.

17. The apparatus of claim 16, in which the at least one processor is further configured transmit, to the O-DU, a fourth message indicating a start of antenna calibration.

18. The apparatus of claim 16, in which the at least one processor is further configured to notify a layer two (L2) of the O-DU of resources for antenna calibration.

19. The apparatus of claim 18, in which the L2 of the O-DU is notified via an interface and the resources for the antenna calibration include frequency and/or time resources that the O-RU intends to use for the antenna calibration.

20. The apparatus of claim 15, in which the radio frequency performance metric relates to a detected temperature or detected humidity.

21. The apparatus of claim 15, in which the at least one processor is further configured to calibrate an antenna according to the self-calibration mode.

22. The apparatus of claim 15, in which the second message further indicates a capability for coordinated-mode calibration.

23. An apparatus for wireless communication by an open radio access network-distribution unit (O-DU), comprising:
   a memory; and
   at least one processor coupled to the memory, the at least one processor configured:
      to receive, from an open radio access network-receiving unit (O-RU), a first message including antenna calibration capabilities; and
      to transmit, responsive to the first message, a second message to the O-RU, the second message including a subscription to calibration mode switching to enable dynamic adaption of an antenna calibration mode to a self-calibration mode by the O-RU prior to expiration of a calibration timer.

24. The apparatus of claim 23, in which the at least one processor is further configured to receive, from the O-RU, a third message including an antenna calibration mode switch notification indicating the self-calibration mode.

25. The apparatus of claim 24, in which the at least one processor is further configured to receive, from the O-RU, a fourth message indicating a start of antenna calibration.

26. The apparatus of claim 24, in which the at least one processor is further configured to notify a layer two (L2) of the O-DU of resources for antenna calibration.

27. The apparatus of claim 26, in which the L2 of the O-DU is notified via an interface and the resources for the antenna calibration include frequency and/or time resources that the O-RU intends to use for the antenna calibration.

28. The apparatus of claim 24, in which the dynamic adaption is triggered in response to a radio frequency performance metric being less than a predefined threshold value prior to the expiration of the calibration timer.

* * * * *